United States Patent  
Zimmer et al.

(10) Patent No.: US 11,049,039 B2
(45) Date of Patent: Jun. 29, 2021

(54) STATIC AND DYNAMIC DEVICE PROFILE REPUTATION USING CLOUD-BASED MACHINE LEARNING

(71) Applicant: McAfee, LLC, San Jose, CA (US)

(72) Inventors: Vincent J. Zimmer, Tacoma, WA (US); Joel R. Spurlock, Portland, OR (US); Ramnath Venugopalan, Webster, NY (US); Ned M. Smith, Beaverton, OR (US); Igor G. Muttik, Berkhamsted (GB); Rajesh Poornachandran, Portland, OR (US)

(73) Assignee: McAfee, LLC, San Jose, CA (US)

( * ) Notice: Subject to any disclaimer, the term of this patent is extended or adjusted under 35 U.S.C. 154(b) by 776 days.

(21) Appl. No.: 15/283,238

(22) Filed: Sep. 30, 2016

(65) Prior Publication Data

US 2018/0096260 A1   Apr. 5, 2018

(51) Int. Cl.
G06N 5/02 (2006.01)
G06N 5/04 (2006.01)
G06N 20/00 (2019.01)

(52) U.S. Cl.
CPC .......... *G06N 20/00* (2019.01); *G06N 5/025* (2013.01); *G06N 5/04* (2013.01)

(58) Field of Classification Search
CPC .......... G06N 20/00; G06N 5/025; G06N 5/04
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,370,474 B1 * | 2/2013 | Reeves | H04L 69/40 709/223 |
| 8,650,287 B2 | 2/2014 | Mahadik et al. | |
| 8,874,138 B2 | 10/2014 | Carmel | |
| 8,955,039 B2 | 2/2015 | Prakash et al. | |
| 9,215,249 B2 | 12/2015 | Smith | |
| 9,311,485 B2 | 4/2016 | Etchegoyen | |
| 9,342,784 B1 * | 5/2016 | Rajagopal | G06F 11/008 |
| 9,589,155 B2 | 3/2017 | Poornachandran et al. | |
| 2011/0010543 A1 * | 1/2011 | Schmidt | G06F 21/57 713/168 |
| 2011/0264608 A1 | 10/2011 | Gonsalves et al. | |

(Continued)

*Primary Examiner* — Kamran Afshar
*Assistant Examiner* — Urmana Islam
(74) *Attorney, Agent, or Firm* — Patent Capital Group (57) ABSTRACT

Disclosed herein are cloud-based machine learning systems and methods for monitoring networked devices to identify and classify characteristics, to infer typical or atypical behavior and assign reputation profiles across various networked devices, and to make remediation recommendations. In some embodiments, a cloud-based machine learning system may learn the typical operation and interfacing of a plurality of reputable devices that are known to be free from malicious software and other threats. In some embodiments, a cloud-based machine learning system may learn the typical operation and interfacing of a device, and may identify atypical operations or interfaces associated with that device by comparing the operations and interfaces to those of a plurality of networked devices or to those of a defined standard reference device.

21 Claims, 5 Drawing Sheets

(56) References Cited

U.S. PATENT DOCUMENTS

| | | |
|---|---|---|
| 2014/0379902 A1 | 12/2014 | Wan et al. |
| 2015/0106926 A1 | 4/2015 | Basavapatna et al. |
| 2015/0178496 A1 | 6/2015 | Kohlenberg et al. |
| 2016/0080420 A1 | 3/2016 | Ray et al. |
| 2016/0099963 A1* | 4/2016 | Mahaffey ............ H04L 63/0227 726/25 |
| 2017/0330197 A1* | 11/2017 | DiMaggio .......... G06Q 10/0635 |

* cited by examiner

STATIC AND DYNAMIC DEVICE PROFILE REPUTATION USING CLOUD-BASED MACHINE LEARNING

TECHNICAL FIELD

The present disclosure relates to protection systems, and more particularly, to a networked device monitoring system with cloud-based machine learning engine for evaluating device operation.

BACKGROUND

The field of electronic security has become significant in today's society as consumers and businesses are increasingly reliant on electronic technology to conduct transactions and enable interactions. As a result of this increased reliance, more and more confidential and sensitive information is being stored on electronic devices and shared across networks. In particular, the Internet provides for exchanging data between different users connected to different computer networks via various types of client devices. While the use of electronic technology has transformed business and personal communications, the availability of confidential information in electronic devices has resulted in increased efforts by unauthorized parties to access such information. Monitoring electronic devices for unauthorized access and implementing protective measures has become is necessary to protect confidential information from unauthorized access.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Disclosed herein are cloud-based machine learning systems for monitoring networked devices to identify and classify characteristics, to infer typical or atypical behavior and assign reputation profiles across various networked devices, and to make remediation recommendations, as well as related methods. In some embodiments, a cloud-based machine learning system may learn the typical operation and interfacing of a plurality of "reputable" devices that are known to be free from malicious software and other threats. In some embodiments, a cloud-based machine learning system may learn the typical operation and interfacing of a device, and may identify atypical operations or interfaces associated with that device. In some embodiments, a cloud-based machine learning system may learn the typical operation and interfacing of a device, and may identify atypical operations or interfaces associated with that device by comparing the operations and interfaces to those of a similar networked devices or to those of a defined standard or reference device (s).

The cloud-based machine learning systems disclosed herein may determine the dynamic fingerprint profile of a device and may employ machine learning to adapt this fingerprint profile as the device operations and behaviors change. The cloud-based machine learning system may infer whether device behavior is typical or not, and may collect and send remote attestation data. The cloud-based machine learning system may further learn typical device behavior based on device data from a plurality of networked devices or may learn typical behavior of a single device, and may adapt inferences and remediation recommendations for that particular device based on the plurality of device data and/or based on the single device data.

Figure 1:
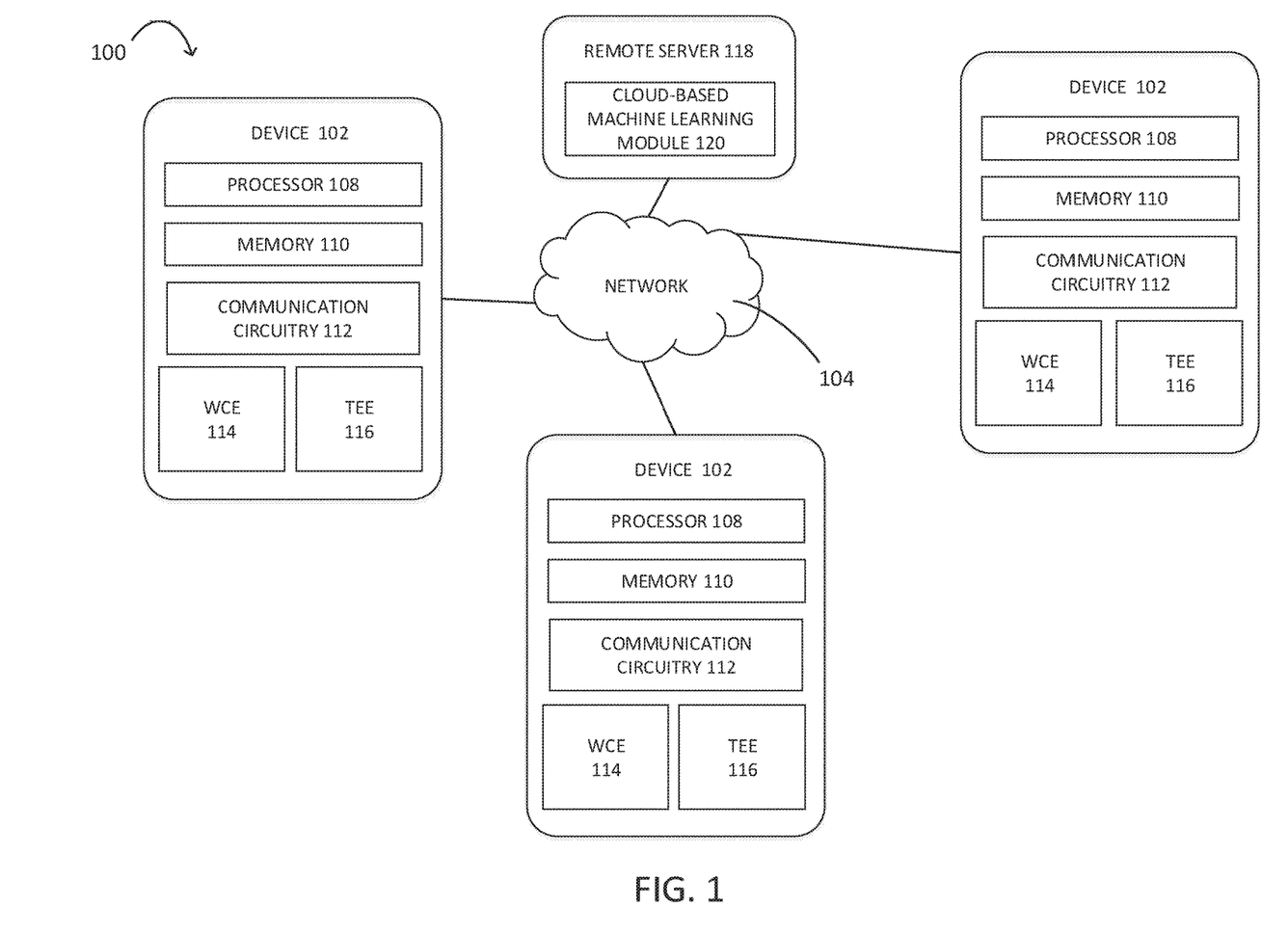
FIG. 1 is a simplified block diagram of an exemplary cloud-based machine learning system for monitoring networked devices, in accordance with various embodiments.

FIG. 1 is a simplified block diagram of an exemplary cloud-based machine learning system (CBML) 100 for monitoring and assigning a reputation score to networked devices. The CBML system 100 may include one or more electronic devices 102, remote server 118, and CBML module 120 that communicate with each other via a network 104. The CBML system 100 may include memory and a processor (not shown). As used herein, CBML module, CBML engine, and CBML administrator may be used interchangeably.

CBML system 100 is a device monitoring system including CBML module 120. CBML module 120 may include one or more processors and one or more memory elements. The memory elements may be any suitable memory including volatile and non-volatile. CBML module 120 collects device 102 data and information regarding device operation and use. CBML module 120 may collect data in "snapshots" where data may be collected, for example, during device boot, at application startup, and/or when interfacing with another device or network and store the data in a memory element. In some embodiments, device data may be collected from a standardized device and/or maybe collected from a device designed to enact scenarios, such as different boot configurations, to provide the CBML module 120 with learning about typical device behavior and usual user interaction. In some embodiments, CBML module 120 may be configured to collect data when device 102 is active or for planned operations to learn user behavior. Once typical behavior is established for the device, CBML module 120 may combine typical behavior data for similar devices to set a baseline for expected behavior. CBML module 120 may also assign a reputation score to the device based on previous behavior of the device and/or the baseline for expected behavior. Unusual or atypical behavior may signify a threat to the device or that the device has been compromised. Unusual behavior may be characterized and classified by CBML module 120. For example, in some embodiments, CBML module 120 may classify the behavior by characterizing it as at least one type of user interaction, may analyze the behavior for potential threats, and may make recommendations to the device for evaluation and/or corrective action. In some embodiments, CBML module 120 may provide an alert to the device and, at times, to the device administrator.

In some embodiments, CBML module 120 may identify at least one operation in the device based on at least one of active operations in the device at the time the snapshot was generated or planned operations in the device at the time the snapshot was generated. In some embodiments, CBML module 120 may verify signatures of software modules associated with the at least one active or planned operation identified in the snapshot. In some embodiments, CBML module 120 may learn user behavior based on comparing the at least one active or planned operation identified in the snapshot to at least one active or planned operation identified in at least one previous snapshot stored in the memory module. In some embodiments, CBML module 120 may learn user behavior based on comparing the at least one active or planned operation identified in the snapshot to the baseline for expected behavior stored in the memory. In some embodiments, CBML module 120 may develop classifications based on the snapshots of data.

The one or more electronic devices 102 may include, for example, desktop computers, laptop computers, mobile devices, personal digital assistants, smartphones, tablets, or other similar devices. As used herein, the terms "device" and "devices" refer individually and/or collectively to any of the large number of electronic devices that may communicate using a communications network and which may be leveraged as a "client" or a "service provider" (as defined below) in accordance with the present disclosure. Also, as used herein, device and platform may be used interchangeably. Other non-limiting examples of devices that may be used in accordance with the present disclosure include cell phones, computer terminals, electronic readers, facsimile machines, kiosks, netbook computers, internet devices, payment terminals, personal digital assistants, media players and/or recorders, set-top boxes, smart phones, tablet personal computers, ultra-mobile personal computers, wired telephones, combinations thereof, and the like. Such devices may be portable or stationary.

The term "client" is used herein to refer to a device that initiates a task or is a networked device participating in CBML system 100. In contrast, the term "service provider" is used to refer to a device that performs one or more aspects of a trusted task on behalf of a client. It should be understood that the terms "client" and "service provider" are used herein for the sake of clarity only, and that any of the clients described herein may be capable of acting as a service provider, and vice versa.

As used in any embodiment herein, the term "module" may refer to hardware, firmware and/or circuitry configured to perform any of the aforementioned operations. A module also may include software. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms a part of one or more devices, as defined previously.

Individual devices (i.e., nodes) in the distributed computing systems described herein may be connected in any suitable fashion. For example, devices within a distributed computing system may be connected via one or more communications networks, i.e., via one or more systems for sending and/or receiving a data signal. Such communications networks may include close range communication, long range communication, and/or combinations thereof.

As used herein, the term "near field communication" means systems and methods for sending/receiving data signals between devices that are relatively close to one another. Close range communication includes, for example, communication between devices using a Bluetooth™ network, a personal area network (PAN), near field communication, a ZigBee network, an Ethernet connection between respective devices in a DCS, combinations thereof, and the like. Close range communication may therefore be understood as direct communication between devices, without the need for intervening hardware/systems such as routers, cell towers, internet service providers, and the like.

The one or more electronic devices 102 may include one or more processors 108 or co-processors. The one or more processors 108 may execute any type of instructions associated with the node to achieve the operations detailed herein this Specification. The one or more processors may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processors may be implemented in hardware, software, firmware, or combinations thereof, as appropriate. Software or firmware implementations of the processors may include computer-executable or machine-executable instructions written in any suitable programming language to perform the various functions described. Hardware implementations of the processors may be configured to execute computer-executable or machine-executable instructions to perform the various functions described. A device 102 may include a chipset (not shown) for controlling communications between one or more processors and one or more of the other components of the device. The processors may also include one or more application specific integrated circuits (ASICs) or application specific standard products (ASSPs) for handling specific data processing functions or tasks.

The one or more electronic devices 102 may include one or more memory elements 110 for storing information and data. The one or more memory elements 110 may include one or more volatile and/or non-volatile memory devices such as, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 110 may store program instructions that are loadable and executable on the processor(s) as well as data generated or received during the execution of these programs. The memory 110 may have stored thereon software modules and/or instructions associated with other components of the device. The memory 110 may include one or more operating systems (O/S) application software.

The one or more electronic devices 102 may include communication circuitry 112. The communication circuitry 112 of device 102 may be embodied as any communication circuitry, device, or collection thereof, capable of enabling communications between the computing device 102 and other remote devices (e.g., the remote server 118). The communication circuitry 112 may be configured to use any one or more communication technology (e.g., wireless or wired communications) and associated protocols (e.g., Ethernet, Bluetooth®, Wi-Fi®, WiMAX, etc.) to effect such communication. Devices 102 may further include GPS and other location identifiers.

Network 104 represents interconnected communication paths for receiving and transmitting packets of information that propagate through CBML system 100. Network 104 may provide a communicative interface between devices and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 104 may include a network controller.

In CBML system 100, network traffic, which is inclusive of packets, frames, signals, and data, among others, may be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may be provided. Suitable interfaces and infrastructure may be provided to enable communication with the cellular network.

The term "packet" as used herein, refers to a unit of data that may be routed between networked devices or between a device and the CBML server. A packet may include a source network address and a destination network address. These network addresses may be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, and/or data.

The one or more devices 102 may include a Wireless Credential Exchange (WCE) module 114 for enforcing security policies by providing a RF-based network independent (out of band) secure communication channel and storage for efficient geo-fencing. WCE 114, for example, may have Wireless Credential Exchange Monza® X UHF RFID chips in some embodiments. WCE 114 may be configured to track a device, store identification data, description data, and/or constraint data associated with the device. In some embodiments, WCE 114 may include (not shown) a processor or co-processor, electrical communication circuitry, RF communication circuitry, and memory. The electrical communication circuitry of WCE 114 may be any communication circuitry, device, or collection thereof, capable of enabling electrical communication between WCE 114 and other components of device 102, such as via point-to-point links, bus links, wires, cables, light guides, printed circuit board traces, among others. In some embodiments, the electrical communication of WCE 114 may be established by electrically coupling pins to a communication bus of device 102, for example, to an inter-integrated circuit (I2C) bus. The RF communication circuitry of WCE 114 may be any communication circuitry, device, or collection thereof, capable of enabling RF communication between WCE 114 and other components of device 102 and/or the remote server 118. In some embodiments, the RF communication circuitry may enable WCE 114 to communicate over any corresponding set of radio frequencies, such as via Near Field Communication (NFC), low frequency, high frequency, ultra-high frequency, among others. In some embodiments, WCE 114 may be configured to communicate with other components of device 102 and/or the remote server 118 using other wireless communication technology. In some embodiments, WCE 114 may be electrically powered by device 102 and may be RF-activated by the remote server 118.

The memory of WCE 114 may be similar to the memory 110 of the computing device 102. The memory of WCE 114 may be any type of volatile or non-volatile memory or data storage capable of storing identification data, description data, constraint data or the like. Identification data may identify the hardware component to which WCE 114 is secured/associated. In some embodiments, identification data may include a unique serial number, bar code, and/or other type of signature of WCE 114. Description data may be any data that describes the corresponding WCE 114, relationships of WCE 114, and/or the corresponding component of WCE 114. For example, the description data may include information regarding WCE 114 itself (e.g., component manufacturer, data structure arrangement, cryptographic encryption, signatures, certificates, and/or hash algorithms utilized for secure communication, etc.), provenance data regarding WCE 114 or the corresponding hardware component (e.g., a log indicating where WCE 114 has been, how its data was modified, etc.), and/or other descriptive information. In some embodiments, description data may be updated throughout a manufacturing supply chain to provide further contextual information. For example, in an embodiment, identification data and description data of WCE 114 may be originally provisioned when WCE 114 is manufactured, updated when components are transferred to another facility, and updated again when device 102 is assembled (i.e. can be updated/tracked throughout the supply chain process/procurement). Constraint data of WCE 114 may include security policy enforcement, such as restrictions, constraints, and/or conditions associated with WCE 114 and/or the corresponding hardware component. For example, WCE 114 may include restrictions, constraints, and/or conditions associated with the modification of data stored in the memory, geographical constraints (e.g., indicating where device 102 or a particular component is authorized to operate or perform a function), temporal constraints (e.g., indicating a period during which device 102 or a particular component is authorized to operate or perform a function), and/or other constraint information. In some embodiments, device 102 may include hospital medical records and constraint data may include a geographical constraint that forces device 102 to shut down (e.g., via an out-of-band RF-communicated instruction) if device 102 leaves an authorized region (e.g., the hospital grounds).

Device 102 may include a trusted execution environment (TEE) 116 for providing a tamper resistant environment (attestation or reputation score) for device 102. TEE 116 is an isolated environment that runs in parallel with the device operating system, providing an enhanced security environment. TEE 116 uses a hybrid approach that utilizes both hardware and software to protect data. Trusted applications running in TEE 116 have access to the full power of a device's main processor and memory, while hardware isolation protects these from user installed apps running in a main operating system. Software and cryptographic isolation inside the TEE protect the trusted applications contained within TEE 116 from each other. TEE 116 may contain a secure policy store and a separate secure communication circuitry for secure (out of band) communications with, for example, the network 104, remote server 118 or WCE 114. WCE 114 and TEE 116, as security policy enforcement modules, may work in tandem to enforce security policies and protections on device 102. Examples of TEE may include Trusted Platform Module (TPM), Converged Security and Manageability Engine (CSME), which is secure firmware that powers the Intel® Active Management Technology (Intel® AMT) system, VT-x, which is Intel's hardware virtualization on the x86 platform, ARM® TrustZone©, and Intel® Software Guard Extensions (Intel® SGX).

Device 102 may include peripheral devices (not shown), which may include any number of additional peripheral or interface devices, such as speakers, microphones, additional storage devices, among others.

Remote server 118 may house the CBML module 120. The term "server" is inclusive of devices used to serve the requests of clients and/or perform some computational task on behalf of clients within CBML system 100. In some embodiments, the remote server 118 may be integrated with or distributed in cloud services or in another network accessible by device 102.

CBML module 120 may collect characteristic and behavioral data from one or more devices 102 and may develop a reputation score for the one or more devices 102 as determined by the rules-based inferences. The reputation score may indicate whether a device 102 has been compromised, is likely to be compromised, or has been compromised but is currently in a secure environment.

Figure 2:
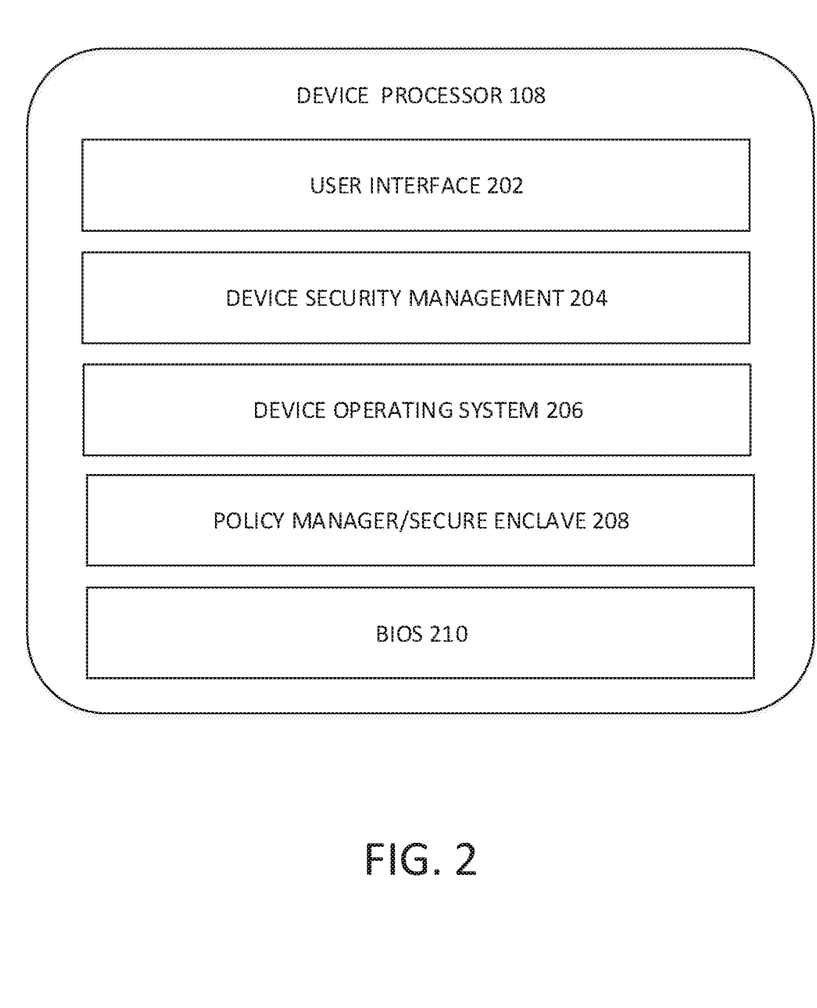
FIG. 2 is a simplified block diagram of an exemplary device monitored by a cloud-based machine learning system, in accordance with various embodiments.

FIG. 2 is a block diagram of an exemplary processor 108 of device 102 illustrating select software components. Device processor 108 may include a user interface 202, security management 204, operating system 206, secure enclave 208 and a basic input/output system (BIOS) 210. Similar features in different figures may be identified with the same reference number for clarity and simplicity.

User interface (UI) 202 is the interaction between a user and device 102. User interface 202 may include, for example, display screen, keyboard, mouse, light pen, help messages, and how an application or website invites interaction and responds.

Security management 204 may include software for comprehensive security and protection of device 102. A typical protection model may include a software component installed in device 102 to monitor for threats. The software component may be administered by a centralized entity that provides updates to the software component and/or policies (i.e., rules) used to monitor for threats (e.g., malware such as viruses or worms, attempts at unauthorized access, etc.).

Operating system 206 is system software that manages computer hardware and software resources and provides common services for computer program functionality.

Secure enclave 208 is a hardware-based technology that seals legitimate software inside an enclave and protects the software from attack by malicious software ("malware"). Secure enclave 208 may be created at the processor level to protect sealed software even from device operating system 206. A processor may have multiple secure enclaves. One example of a secure enclave 208 is Intel® SGX. Secure enclave 208 may include policy manager software for enforcing security and protection protocols on device 102. Another example of a secure enclave is ARM® TrustZone©.

BIOS 210 is firmware in a device, which loads into memory at the beginning of the boot process. BIOS 210 is essentially the machine code typically stored in some form of non-volatile memory to allow processor 108 to perform tasks such as initialization, diagnostics, loading the operating system kernel from mass storage, and routine input/output ("I/O") functions. Traditionally, BIOS 210 is implemented in Erasable Programmable Read Only Memory ("EPROM"), however, more recent advances enable it to be implemented in flash memory. Device 102 may include a measured and secure boot, however, validation or attestation typically occurs post-boot and may fail to detect malware. Since BIOS 210 boots a device 102 and helps load the operating system 208, once infected, malware may be deployed that survives reboots, system wiping and reinstallations. Measured Boot and Secure Boot are additional technologies that may be implemented to assure that that when a platform boots, the running code has not been compromised.

Figure 3:
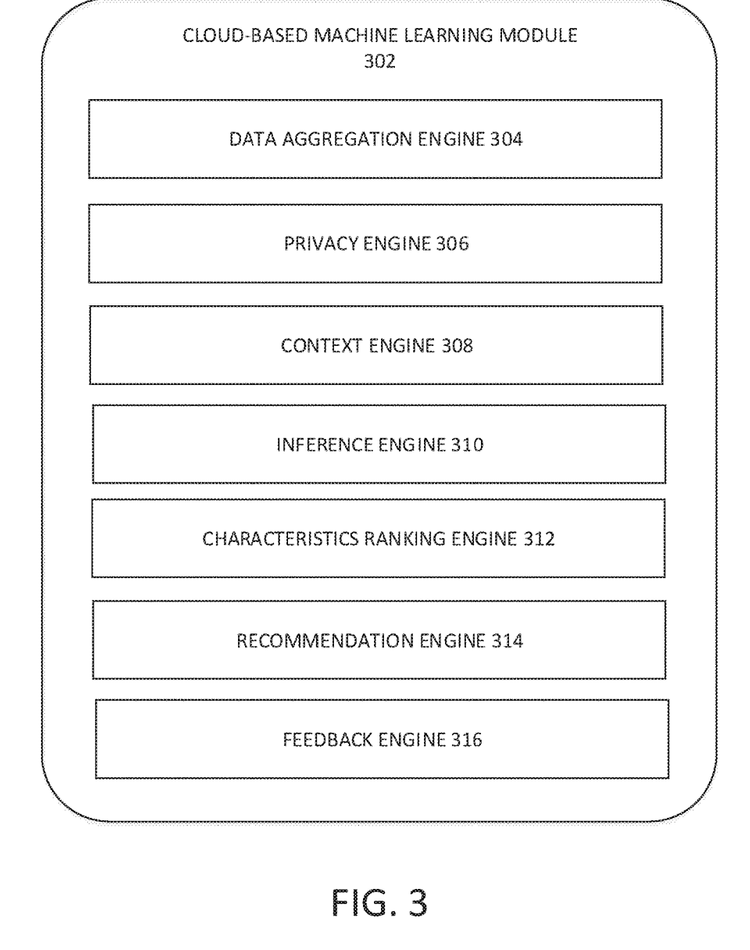
FIG. 3 is a simplified block diagram of a cloud-based machine learning module, in accordance with various embodiments.

FIG. 3 is a simplified block diagram of an exemplary CBML system. CBML system monitors devices 102 to learn behaviors and characteristics typical to the devices 102, and assign a reputation score or profile. CBML system may be described as a device behavior model generator, where data from a plurality of networked devices is collected and device behavior patterns are learned. Atypical patterns may be recognized and identified more readily, and recommendations for corrective action may be issued. A device, including device data, may be included in CBML system by voluntarily opting into the service or may be required by a service provider. In some embodiments, device data may be provided by an agent or a third party. The types of machine learning that may be used by the CBML system to provide "artificial intelligence" to detect certain features may include using a neural network as a portion of the artificial intelligence. In some embodiments, logic programming, automated reasoning, Bayesian networks, decision theory, or statistical learning methods may be used. CBML system 302 may include one or more processors and one or memory elements for storing data, executing learning algorithms, and performing other functionalities of CBML system. CBML system 302 may include data aggregation engine 304, privacy engine 306, context engine 308, inference engine 310, characteristics ranking engine 312, recommendation engine 314 and feedback engine 316. In some embodiments, each engine may include one or more processors, one or memory elements, and communication circuitry for communicating with devices 102 and interfacing with other engines in the CBML system. In some embodiments, CBML system may include one or more processors, one or memory elements, and communication circuitry to support the functions performed by the engines.

Aggregation engine 304 may collect information from devices 102. Information may include device location and movement, operating system interfacing, associated software running, application data, as well as BIOS, WCE security management and network profile, appropriate snapshot data in configurable sample intervals. BIOS data may include validation data (post-boot) and/or measured boot data behavioral profile (i.e., identifying list of actions performed during boot). BIOS may be run in various predefined configurations and scenarios to establish a broad baseline for CBML. Additional boot data may be provided by TEE during boot. WCE may report on a network-independent location with a global view of device 102 and the expected or standard behavior in that network. Other information may include how device is accessed, when device is accessed and what applications are accessed to establish regular use of device 102 by a user.

CBML module 120 aggregates data to build a device profile and to build an aggregated device profile for similar devices such that device data for a plurality of devices is combined to create a larger profile sample. For example, a profile may have n-tuple of various data for Device 1 where P_Device_1={code hash, data hash, action list, location, ownership state}. A reputation of BIOS for P_Device_1 may be made at various times, including when first seen, when last seen, age, prevalence, among others. CBML module 120 may aggregate P_Device_1 with P_Device_2, P_Device_3, etc. to generate a large data set profile and reputation for a device based on a plurality of similar devices.

Aggregation engine 304 may be configured to collect data at defined intervals, for a set period of time, which includes intermittently for a period of time or continuously for a period of time, and/or for particular types of data, among others. In some embodiments, aggregation engine 304 may collect data continuously while device 102 is networked and active. Aggregation engine 304 may collect data in "snapshots" where the information collected on device 102 is dynamic and changes based on device status and/or device usage. For example, data from device 102 may include device identification and one or more security policies. The device identification may include platform identification data indicative of one or more reference hardware components of device 102, which identify the hardware components that are supposed to be included on device 102 (e.g., of the particular make, model, serial number, etc.). Platform identification data may be provided by original equipment manufacturers (OEMs) to indicate which components are supposed to be included on device 102 and may be used to determine whether one or more components of device 102 has been modified. For example, a laptop computer would have different reference/platform identification data than a smartphone because those devices have different hardware components. It may be appreciated that the identification data may be embodied as any suitable data structure configured to perform the functions described herein. For example, identification data may include searchable tables for multiple platform configurations. Security policies may identify various conditions and security actions to be taken in response to conditions. For example, security policies may indicate that device 102 is to prevent the operating system from booting if one of the components has been modified. Security policies may identify other suitable actions and/or conditions as well. Dynamic communication may refer to individual client devices and the cloud server communicating back-and-forth, at specified sampled intervals or on an as need-basis, for remediation based on a device's dynamic context instead of static remote attestation and/or policy deployment.

Privacy engine 306 may be included to protect user data, particularly, privacy sensitive data. Privacy engine 306 may strip data of private or sensitive user information, or may generate a unique session key to secure communication channel between device 102 and remote server 118 during data collection. Privacy engine 306 may identify private device data and may determine which privacy policy or measures to apply to protect private device data.

Context engine 308 may perform context identification and classification based on aggregated data. Context may identify the environment in which a device is operating and how a device interacts within this environment. Context may define an environment as a whole, or may define an environment at a particular point in time. Context may change regularly, especially if a device is a portable or mobile device. Context engine may be policy and/or rule based and may be configurable based on learned contexts. Various contexts may be inferred. For example, based on the snapshot data on hardware configuration and/or software configuration of a device, the device's context may be tracked through a supply chain to identify the device's location or status, i.e., manufacturing, assembly, packaging, shipment, in-store, purchased by customer, on-boarded with carrier, etc. In other examples, context may be the wireless network to which the device is connected, or the lack of a wireless network connection because the wireless connection ability is disabled by the applied security policy.

Inference engine 310 may identify characteristics and behaviors in aggregated data, and may apply rules-based inferences to relate data from various devices. Characteristics may include software and/or hardware attributes that define the device platform. Software characteristics may be, for example, firmware, operating system, user interface, among others. Hardware characteristics may be, for example, processor, I/O, memory, among others. Inference engine 310 may correlate conditions, scenarios and behaviors to further refine aggregated data to identify the environment in which the device is operating and determine whether or not the device behavior is typical for that environment. Inference engine 310 may infer security policies from the device context and link these policy restrictions to the identified characteristics. For example, if particular device applications are blocked, such as a camera, inference engine 310 may infer the device is in a secured location and security policies of that location are being applied. Further, to generate a common scale, inference engine 310 may execute an algorithm to assign a reputation score or profile based on the device data learning from aggregated device data, assigned security policies, contextualized device data, and inferences.

Characteristics ranking engine 312 may sort and rank aggregated data characteristics that were identified by inference engine 310 based on various criteria. For example, a characteristic may be ranked higher or lower depending on the number of times the characteristic was observed within a given sample interval in a device and/or the number of different devices. Characteristics identification and classification may be performed based on defined policies or rules that may be updated with additional learning. For example, characteristics that indicate a likely threat or a catastrophic impact (e.g., data transfer to an unknown third party) may be ranked higher.

Recommendation engine 314 may provide a remediation policy and make recommendations based on the identified characteristics, context, and/or associated rankings. In some embodiments, if identified characteristics indicate atypical or suspect behavior, alerts may be sent to device 102 and/or to the device administrator. In some embodiments, a remediation policy may be sent to TEE 116 for implementation. In some embodiments, older data is compared to newer data to assess incremental changes in identified characteristics; if the incremental changes impact an existing policy, recommendation engine 314 may recommend updating the policy or may recommend enforcement. In some embodiments, recommendation engine 314 may provide alternative options for remediation. In some embodiments, recommendation engine may recommend a remediation, but may not provide a specific recommendation. In some embodiments, recommendation engine may provide notice that no remediation is necessary.

Feedback engine 316 may improve the learning by CBML module 120 by providing feedback and corrections to past inference errors and/or mischaracterizations. Feedback engine 316 may receive feedback from remote administrator, IT Administrators, device users via an interface to reduce false positives, fine tune learning algorithm, etc. to adapt its learning by changing its inferences and/or modifying data collection and aggregation based on this feedback. For example, a device may not respond to a heart-beat from CBML module 120 within a specified time interval, and based on this non-response, CBML module 120 may flag the device as stolen or tampered with to avoid communication with CBML module. As used herein, heart-beat may refer to a method for actively watching for and detecting a system failure or offline status. In reality, the non-response by the device may be due to poor network connection, which may be confirmed by the user via second factor authentication along with other verification data. In response to this feedback, CBML module 120 may increase its non-response tolerance window.

Figure 4A:
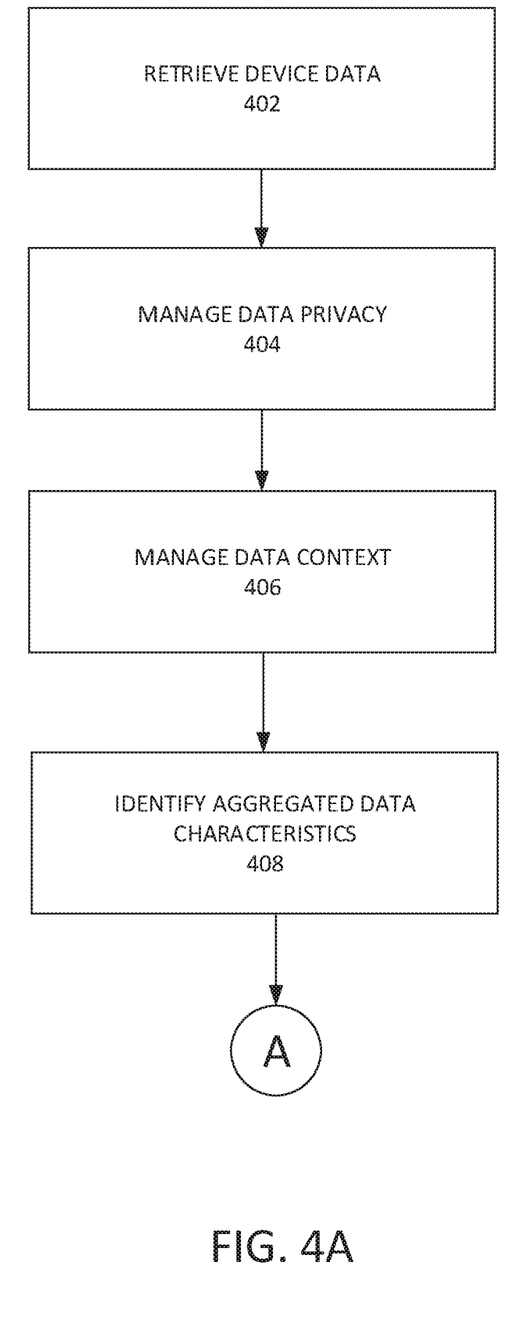
FIGS. 4A and 4B are flow diagrams of an illustrative method of monitoring devices and assigning reputation score to a device using a cloud-based machine learning module, in accordance with various embodiments.
Figure 4B:
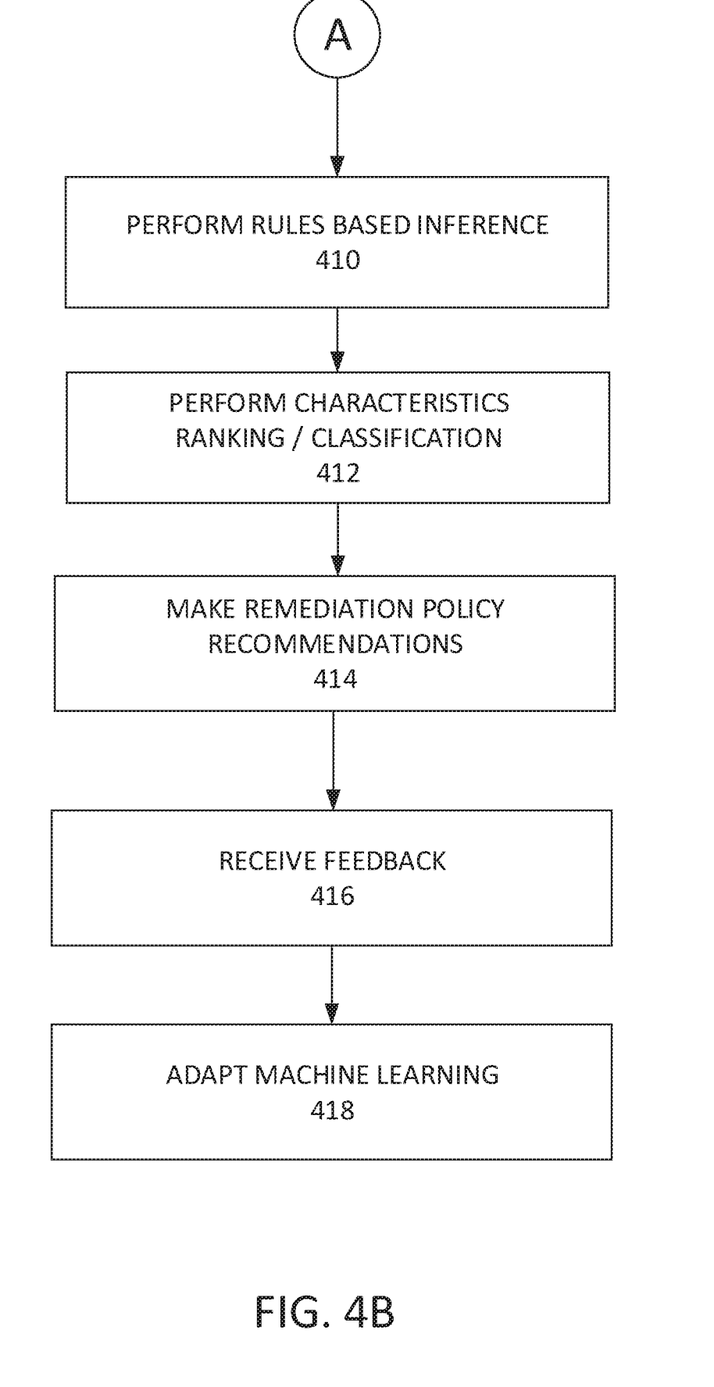

FIGS. 4A and 4B are flow diagrams of an illustrative method of monitoring devices and assigning a reputation score using a cloud-based machine learning module. At 402, CBML module 120 retrieves data from one or more devices 102 and stores data in memory. The retrieved data includes device behavioral information and device usage. Data may be retrieved from, for example, BIOS, WCE, security management software, secure policy manager and network profile. BIOS data may include boot information, both during boot and post-boot processes. As described previously, data may be retrieved at defined intervals, for a set period of time, or for particular types of data, among others. In some embodiments, data may be "pushed" to the CBML module 120 by device 102. In some embodiments, data may be dynamic, where data may change based on device status and/or device usage (i.e., based on "soft" characteristics of a device). For example, data from device 102 may include device status and one or more security policies. Security policies may identify various conditions and security actions to be taken in response to conditions. For example, security policies may indicate that device 102 is to prevent the operating system from booting if one of the components has been modified. Security policies may be updated by remote administrator (i.e., IT administrator for networked device). In some embodiments, data may be static, where data is unchanged based on standard manufactured components. Some static data examples include embedded controllers that have ROM, secure memory that requires a security mechanism to make changes, among others. Further, the CBML module 120 may characterize and recognize static to dynamic changes as expected or unexpected (i.e., an anomaly). For example, if secure memory is altered using the security mechanism, this would be an expected change whereas a change with the security mechanism would be anomaly.

At 404, CBML module 120 manages data privacy. Data privacy may be required and enforced by device 102, a user of device or may be required by the CBML module 120. Data privacy management may include scrubbing private information from data or may require a secure communication channel for transmitting data, among others.

At 406, CBML module 120 manages context from which data was retrieved. Context is a set of attributes that may define device status for effective policy evaluation. As described previously, context may be based on hardware configuration and/or software configuration to identify a device's location or status, i.e., manufacturing, assembly, packaging, shipment, in-store, purchased by customer, on-boarded with carrier, etc. Depending on the device status, context helps assessing whether data attributes and characteristics are typical or atypical.

At 408, CBML module 120 identifies characteristics in the aggregated data. Characteristics may include hardware versioning, software versioning, patch levels, device location, storage capabilities, compute capabilities, communication capabilities, pending patches to be deployed, among others.

At 410, CBML module 120 performs rules-based inferences to correlate data across the variety of sources originated from various devices. Rules-based inferences may be defined by the CBML module based on current or near future industry threat landscape, among others. A reputation profile may be assigned for a device based on these inferences. For example, inferences may determine that a device with software version S and hardware version H with patch version P is susceptible to attack vector A and requires patches P' to be deployed in order to mitigate an attack.

At 412, CBML module 120 performs classification and ranking of identified characteristics. Classifications may include geo-location, temporal, threat models, compute capabilities, storage capabilities, communication capabilities, user interface options, software versions, hardware versions, etc. Rankings may include ranking of devices being monitored based on one or more classification metrics. For example, the CMBL module 120 may query to obtain list of devices that belong to a specified geo with certain hardware and software versioning. In another example, the CBML module 120 may identify devices based on location and rank devices within a specific area for immediate software updates.

At 414, CBML module 120 makes remediation policy recommendations customized to each device. In some embodiment, CMBL module 120 communicates recommendations directly to a device TEE via out-of-band communications. In some embodiments, enforcement may be accomplished via TEE 116 in each device with remote administrator supervision. In some embodiments, CMBL module 120 may communicate recommendations to a local administrator (e.g. a store technician) who may program WCE 114 on the device 102 with the updated policy recommendations. An example remediation policy may be a soft disable of a network interface until a specific patch is applied and verified successfully. Another example remediation policy may be to lockout or shutdown a device based on criticality of the vulnerability identified.

At 416, CBML module 120 may receive feedback from each device TEE 116, security management software, user inputs, and crowd-sourced feedback from community users, among others. Feedback may include, for example, denying reboot requirements, failure to process update recommendations, or a situation of interrupted network service, for example, if a device blackout scenario occurred due to a device network glitch (i.e., a device failed a heart-beat check with cloud server, such that the device was locked out). In some embodiments, the CBML module may receive feedback on its inferences and, based on the feedback, adjust rules for assigning inferences. In some embodiments, the CBML module may receive feedback on characteristics and may change policies for identifying and classifying characteristics. In some embodiments, the CMBL module may adjust its policies based on a remote administrator reconfiguring its policies for networked devices and communicating the updated policies to the CBML module. In some embodiments, a device user may communicate policies to the CMBL module. In some embodiments, a remote administrator may overrule device user preferences and require the CBML module to enforce administrator's policies or the administrator may enforce its own policies.

At 418, CBML module 120 adapts its learning by modifying its rules, associated policies for inference, recommendations, and rankings, among others. For example, CBML module may change to require rebooting once a week rather than daily, or recognize regular interrupted network service as travel time from one location to another. In some embodiments, based on its learning, CBML module 120 may identify new policies, rules and recommendations and communicate proposals to remote administrator.

In some embodiments, CBML module may adapt its recommendations based on specific feedback. For example, CBML module may recommend a remediation protocol of apply a patch and reboot to a device. If CBML module identifies that user is in a critical meeting within the corporate environment, which is verified to be safe, then user of the device may snooze the reminder to reboot for a period of time (e.g. 2 hours). This may be propagated to the CBML module, which may adapt its recommendation by proposing an alternative remediation wherein a specific interface may be disabled such as Bluetooth™. The user may respond with acceptance. If the user responds with a rejection of the proposed alternative, the dialogue may continue.

In some embodiments, CBML module may make proactive recommendations based on community feedback. For example, CBML module may receive data from a community of devices that a certain brittle code has undesirable failover characteristics on a remote part of the network. CBML module may identify another community of devices having a like system that possess the brittle code, which could enter the system into a similar circumstance resulting in undesirable failover behavior. CBML module may make the recommendation to correct the brittleness even though the undesired behavior was never actually observed in the current system.

Other Notes and Examples

Each of these non-limiting examples may stand on its own, or may be combined in various permutations or combinations with one or more of the other examples.

Example 1 is a method including: identifying a collection of data, wherein the collection of data comprises device data generated by a plurality of networked devices; executing a machine learning algorithm on the collection of data to: aggregate received device data; assign a context to aggregated device data; generate aggregated device data characteristics; perform rules-based inference on identified characteristics; generate a ranking of inferred characteristics; and determine whether to make a remediation recommendation.

Example 2 may include the subject matter of Example 1, and may further include: executing a machine learning algorithm on the collection of data to further: make the remediation recommendation, if determined to make a remediation recommendation.

Example 3 may include the subject matter of any of Examples 1-2, and may further include: executing a machine learning algorithm on the collection of data to further: receive feedback; and adapt rules-based inferences based on the feedback.

Example 4 may include the subject matter of any of Examples 1-3, and may further specify that determining whether to make a remediation recommendation is based on an identified characteristic in a device as compared to the identified characteristic in the plurality of networked devices.

Example 5 may include the subject matter of any of Examples 1-3, and may further include: executing a machine learning algorithm on the collection of data to further: assign a reputation score based on the inferred device data characteristics.

Example 6 may include the subject matter of any of Examples 1-5, and may further specific that receiving the collection of data occurs intermittently for a period of time.

Example 7 may include the subject matter of any of Examples 1-6, and may further specify that receiving device data includes receiving device policy data; and may further specify that determining whether to make a remediation recommendation is based on the device policy data.

Example 8 may include the subject matter of any of Examples 2-7, and may further include: executing a machine learning algorithm on the collection of data to further: receive a rejection of the remediation recommendation; and make an amended remediation recommendation.

Example 9 is an apparatus including: a memory element operable to store electronic code; and a processor operable to execute instructions associated with the electronic code, such that the apparatus is configured to: receive a collection of data, wherein the collection of data comprises device data generated by a plurality of networked devices; aggregate received device data; assign a context to aggregated device data; generate aggregated device data characteristics; perform rules-based inference on identified device data characteristics; generate a ranking for inferred device data characteristics; and determine whether to make a remediation recommendation.

Example 10 may include the subject matter of Example 9, and may be further configured to: make the remediation recommendation, if the processor determines to make a remediation recommendation.

Example 11 may include the subject matter of any of Examples 9-10, and may be further configured to: receive feedback; and adapt rules-based inferences based on the feedback.

Example 12 may include the subject matter of any of Examples 9-11, and may be further configured to: assign a reputation profile based on inferred device data characteristics.

Example 13 may include the subject matter of any of Examples 9-11, and may further specify that determining whether to make a remediation recommendation is based on an identified characteristic in a device as compared to the identified characteristic in the plurality of networked devices.

Example 14 may include the subject matter of any of Examples 9-13, and may further specify that receiving the collection of data occurs intermittently for a period of time.

Example 15 may include the subject matter of any of Examples 9-14, and may further specify receiving device data includes receiving device policy data; and may further specify that determining whether to make a remediation recommendation, is based on the device policy data.

Example 16 may include the subject matter of Example 10, and may be further configured to: receive a rejection of the remediation recommendation; and make an amended remediation recommendation.

Example 17 is a system including: a plurality of networked devices; a device behavior model generator including: a memory element; and a processor, the processor operable to execute instructions to: receive a collection of data, wherein the collection of data comprises device data generated by a plurality of networked devices; and execute a machine learning algorithm on the collection of data to: aggregate received device data; assign a context to aggregated device data; generate aggregated device data characteristics; perform rules-based inference on identified device data characteristics; generate a ranking for inferred device data characteristics; and determine whether to make a remediation recommendation; and a network, wherein the network connects the plurality of networked devices and the device behavior model generator.

Example 18 may include the subject matter of Example 17, and may further specify that the processor is further configured to execute a machine learning algorithm on the collection of data to: make the remediation recommendation, if the processor determines to make a remediation recommendation.

Example 19 may include the subject matter of Example 18, and may further specify that the processor is further configured to execute a machine learning algorithm on the collection of data to: receive feedback and adapt rules-based inferences based on the feedback.

Example 20 may include the subject matter of Example 18, and may further specify that the processor is further configured to execute a machine learning algorithm on the collection of data to: receive a rejection of the remediation recommendation; and make an amended remediation recommendation.

Example 21 is at least one machine accessible storage medium having instructions stored thereon, the instructions when executed on a machine, cause the machine to: receive a collection of data, wherein the collection of data comprises device data generated by a plurality of networked devices; execute a machine learning algorithm on the collection of data to: aggregate received device data; apply privacy policy to private device data; assign a context to aggregated device data; generate aggregated device data characteristics; perform rules-based inference on identified device data characteristics; generate a ranking for inferred device data characteristics; and determine whether to make a remediation recommendation.

Example 22 may include the subject matter of Example 21, and may further specify that the instructions, when executed, further cause a machine to: make the remediation recommendation, if the machine learning algorithm determines to make a remediation recommendation.

Example 23 may include the subject matter of Example 21, and may further specify that the instructions, when executed, further cause a machine to: receive feedback; and adapt rules-based inferences based on the feedback.

Example 24 may include the subject matter of Example 21, and may further specify that the instructions, when executed, further cause a machine to: assign a reputation profile based on inferred device data characteristics.

Example 25 may include the subject matter of Example 21, and may further specify that determining whether to make a remediation recommendation is based on an identified characteristic in a device as compared to the identified characteristic in the plurality of networked devices.

Example 26 may include the subject matter of Example 21, and may further specify that receiving the collection of data occurs intermittently for a period of time.

Example 27 may include the subject matter of Example 21, and may further specify that receiving the collection of data includes receiving device policy data; and may further specify that determining whether to make a remediation recommendation is based on the device policy data.

Example 28 may include the subject matter of Example 22, and may further specify that the instructions, when executed, further cause a machine to: receive a rejection of the remediation recommendation; and make an amended remediation recommendation.

Example 29 is a system including: means for receiving a collection of data, wherein the collection of data comprises device data generated by a plurality of networked devices; means for aggregating received device data; means for assigning context to aggregated device data; means for generating aggregated device data characteristics; means for performing rules-based inference on identified device data characteristics; means for generating a ranking for inferred device data characteristics; and means for determining whether to make a remediation recommendation.

Example 30 may include the subject matter of Example 29, and may further include means for making the remediation recommendation, if determined to make a remediation recommendation.

Example 31 may include the subject matter of Example 29, and may further include means for receiving feedback and adapt rules-based inferences based on the feedback.

Example 32 may include the subject matter of Example 30, and may further include means for receiving a rejection of the remediation recommendation; and means for making an amended remediation recommendation.

Example 33 is a system comprising means for performing the method of any of Examples 1-8.

Example 34 may include the subject matter of Example 33, and may further specify that the means comprise machine-readable code that when executed, cause a machine to perform one or more steps of the method of any of Examples 1-8.

What is claimed is:
1. A method comprising:
identifying a collection of data stored in a memory element, wherein the collection of data comprises device data generated by a plurality of networked devices during device boot, at application startup, and when interfacing with another device in the plurality of networked devices, and wherein the device data comprises device platform identification data including hardware configuration and software configuration; and
executing a cloud-based machine learning algorithm on the collection of data to:
aggregate received device data;
assign a context to the aggregated device data, wherein the context identifies a status or location of a device when the device data was generated;
generate identified characteristics from the aggregated device data;
perform rules-based inferences on the identified characteristics and the context to determine whether a device is performing in accordance with an aggregated device profile for similar devices of the plurality of networked devices, wherein the identified characteristics include a hardware characteristic based on the hardware configuration and a software characteristic based on the software configuration;
generate a ranking of the identified characteristics, wherein an identified characteristic is ranked higher if the identified characteristic is observed greater than a threshold number of times, if the identified characteristic is atypical for the hardware configuration, or if the identified characteristic is atypical for the software configuration;

determine, based on the ranking of the identified characteristics and the rules-based inferences, whether to make a first remediation recommendation;
make a first remediation recommendation based on the determination to make a first remdiation recommendation;
receive feedback;
adapt the rules-based inferences based on the feedback; and
determine whether to make a second remediation recommendation based on the adapted rules-based inferences.

2. The method of claim 1, further comprising:
executing the cloud-based machine learning algorithm on the collection of data to further:
make a second remediation recommendation based on the determination to make a second remediation recommendation.

3. The method of claim 1, wherein determining whether to make the first or the second remediation recommendation is based at least in part on an identified characteristic in a device as compared to the identified characteristic in the plurality of networked devices.

4. The method of claim 1, further comprising:
executing the cloud-based machine learning algorithm on the collection of data to further:
assign a reputation score based at least in part on the identified characteristics and the rules-based inferences.

5. The method of claim 1, wherein receiving the collection of data occurs intermittently for a period of time.

6. The method of claim 1, wherein receiving device data further includes receiving device security policy data; and wherein determining whether to make the first or the second remediation recommendation is based at least in part on the device security policy data.

7. An apparatus comprising:
one or more memory elements operable to store a cloud-based machine learning algorithm; and
one or more processors operable to execute the cloud-based machine learning algorithm, such that the apparatus is configured to:
receive a collection of data, wherein the collection of data comprises device data generated by a plurality of networked devices during device boot, at application startup, and when interfacing with another device in the plurality of networked devices, and wherein the device data comprises device platform identification data including hardware configuration and software configuration;
aggregate received device data;
assign a context to the aggregated device data, wherein the context identifies a status or location of a device the device data was generated;
generate identified characteristics from the aggregated device data;
perform rules-based inferences on the identified characteristics and the context to determine whether a device is performing in accordance with an aggregated device profile for similar device of the plurality of networked devices, wherein the identified characteristics include a hardware characteristic based on the hardware configuration and a software characteristic based on the software configuration;
generate a ranking for the identified characteristics, wherein an identified characteristic is ranked higher if the identified characteristic is observed greater than a threshold number of times, if the identified characteristic is atypical for the hardware configuration, or if the identified characteristic is atypical for the software configuration;
determine, based on the ranking of the identified characteristics and the rules-based inferences, whether to make a first remediation recommendation;
make a first remediation recommendation based on the determination to make a first remediation recommendation;
receive feedback;
adapt the rules-based inferences based on the feedback; and
determine whether to make a second remediation recommendation based on the adapted rules-based inferences.

8. The apparatus of claim 7, further configured to:
make a second remediation recommendation based on the determination to make a second remediation recommendation.

9. The apparatus of claim 7, further configured to:
assign a reputation profile based at least in part on the identified characteristics and the rules-based inferences.

10. The apparatus of claim 7, wherein determining whether to make the first or the second remediation recommendation is based at least in part on an identified characteristic in a device as compared to the identified characteristic in the plurality of networked devices.

11. The apparatus of claim 7, wherein receiving the collection of data occurs intermittently for a period of time.

12. The apparatus of claim 7, wherein receiving device data further includes receiving device security policy data; and wherein, determining whether to make the first or the second remediation recommendation, is based at least in part on the device security policy data.

13. A system comprising:
a plurality of networked devices;
a device behavior model generator comprising:
one or more memory elements; and
one or more processors, the one or more processors operable to execute instructions to:
receive a collection of data, wherein the collection of data comprises device data generated by a plurality of networked devices during device boot, at application startup, and when interfacing with another device in the plurality of networked devices, and wherein the device data comprises device platform identification data including hardware configuration and software configuration; and
execute a cloud-based machine learning algorithm on the collection of data to:
aggregate received device data;
assign a context to the aggregated device data, wherein the context identifies a status or location of a device when the device data was generated;
generate identified characteristics from the aggregated device data;
perform rules-based inferences on the identified characteristics and the context to determine whether a device is performing in accordance with an aggregated device profile for similar devices of the plurality of networked devices, wherein the identified characteristics include a hardware characteristic based on the hardware configuration and a software characteristic based on the software configuration;

generate a ranking of the identified characteristics, wherein an identified characteristic is ranked higher if the identified characteristic is observed greater than a threshold number of times, if the identified characteristic is atypical for the hardware configuration, or if the identified characteristic is atypical for the software configuration;

determine, based on the ranking of the identified characteristics and the rules-based inferences, whether to make a first remediation recommendation;

make a first remediation recommendation based on the determination to make a first remediation recommendation;

receive feedback;

determine whether to make a second remediation recommendation based on the adapted rules-based inferences; and a network, wherein the network connects the plurality of networked devices and the device behavior model generator.

14. The system of claim 13, wherein determining whether to make the first or the second remediation recommendation is based at least in part on an identified characteristic in a device as compared to the identified characteristic in the plurality of networked devices.

15. The system of claim 14, wherein the one or more processors are further configured to execute the cloud-based machine learning algorithm on the collection of data to:

make a second remediation recommendation based on the determination to make a second remediation recommendation.

16. The system of claim 14, wherein the one or more processors are further configured to execute the cloud-based machine learning algorithm on the collection of data to:

assign a reputation profile based at least in part on the identified characteristics and the rules-based inferences.

17. At least one non-transitory computer readable storage medium having instructions stored thereon, the instructions when executed on a machine, cause the machine to:

receive a collection of data, wherein the collection of data comprises device data generated by a plurality of networked devices during device boot, at application startup, and when interfacing with another device in the plurality of networked devices, and wherein the device data comprises device platform identification data including hardware configuration and software configuration; and execute a cloud-based machine learning algorithm on the collection of data to:

aggregate received device data;

apply privacy policy to private device data;

assign a context to the aggregated device data, wherein the context identifies a status or location of a device when the device data was generated;

generate identified characteristics from the aggregated device data;

perform rules-based inferences on the identified and the context to determine whether a device is performing in accordance with an aggregated device profile for similar devices of the plurality of network devices, wherein the identified characteristics include a hardware characteristic based on the hardware configuration and a software characteristic based on the software configuration;

generate a ranking for the identified characteristics, wherein an identified characteristic is ranked higher if the identified characteristic is observed greater than a threshold number of times, if the identified characteristic is atypical for the hardware configuration, or if the identified characteristic is atypical for the software configuration;

determine, based on the ranking of the identified characteristics and the rules-based inferences, whether to make a first remediation recommendation:

make a first remediation recommendation based on the determination to make a first remediation recommendation;

receive feedback;

determine whether to make a second remediation recommendation based on the adapted rules-based inferences.

18. The at least one non-transitory computer readable storage medium of claim 17, wherein receiving device data further includes receiving device security policy data; and wherein, determining whether to make the first or the second remediation recommendation, is based at least in part on the device security policy data.

19. The at least one non-transitory computer readable storage medium of claim 17, wherein the instructions, when executed, further cause the machine to:

make a second remdiation recommendation based on the determination to make a second remediation recommendation.

20. The at least one non-transitory computer readable storage medium of claim 17, wherein the instructions, when executed, further cause the machine to:

assign a repuatation profile based at least in part on the identified characteristics and the rules-based inferences.

21. The at least one non-transitory computer readable storage medium of claim 17, wherein determining whether to make the first or the second remediation recommendation is based at least in part on an identified characteristic in a device as compared to the identified characteristic in the plurality of networked devices.

* * * * *

UNITED STATES PATENT AND TRADEMARK OFFICE
CERTIFICATE OF CORRECTION

PATENT NO. : 11,049,039 B2
APPLICATION NO. : 15/283238
DATED : June 29, 2021
INVENTOR(S) : Vincent J. Zimmer et al.

It is certified that error appears in the above-identified patent and that said Letters Patent is hereby corrected as shown below:

In the Claims

In Column 17, Claim 1, Line 5, delete "remdiation" and insert -- remediation --, therefor.

In Column 19, Claim 13, Line 17, delete "determine" and insert -- adapt the rules-based inferences based on the feedback; and determine --, therefor.

In Column 20, Claim 17, Line 9, delete "network" and insert -- networked --, therefor.

In Column 20, Claim 17, Line 28, delete "determine" and insert -- adapt the rules-based inferences based on the feedback; and determine --, therefor.

In Column 20, Claim 19, Line 4, delete "remdiation" and insert -- remediation --, therefor.

In Column 20, Claim 20, Line 4, delete "repuatation" and insert -- reputation --, therefor.

Signed and Sealed this
Tenth Day of August, 2021

Drew Hirshfeld
*Performing the Functions and Duties of the
Under Secretary of Commerce for Intellectual Property and
Director of the United States Patent and Trademark Office*